Patented Jan. 19, 1954

2,666,767

UNITED STATES PATENT OFFICE 2,666,767

CHLORMETHYLATION OF VAT DYES OF THE PYRANTHRONE, ANTHANTHRONE, AND DIBENZPYRENEQUINONE SERIES

David I. Randall and Tellis A. Martin, Easton, Pa., assignors to General Aniline & Film Corporation, New York, N. Y., a corporation of Delaware No Drawing. Application December 1, 1950, Serial No. 198,744

6 Claims. (Cl. 260—359)

This invention relates to vat dye intermediates of polycyclic quinones. More particularly it relates to the chlormethylation products of vat dyes of the pyranthrone, anthanthrone, and dibenzpyrenequinone series.

Vat dyes of the polycyclic quinones are insoluble and not substantive to fabrics as such, but form a valuable class of dyes due to their ability to pass into solution in a reduced or leuco form which may be applied to the fabric. Alkaline solutions of the reduced or leuco form of these dyes possess great affinity for the fiber and may be readily reoxidized by known methods to reform the insoluble dye on the fiber.

It has now been discovered that the pyranthrone, anthanthrone, and dibenzpyrenequinone vat dyes may be converted to their halomethyl and particularly their chloromethyl derivatives. These chloromethyl derivatives form an extremely valuable new class of vat dye intermediates. Highly colored soluble dyes may be prepared from these intermediates by conversion to the quaternary ammonium and isothiouronium compounds. Such conversion products may be used to dye cotton directly from aqueous solution. The unconverted chloromethyl polycyclic quinones of these series are also valuable as vat dyes themselves. When the chloromethyl derivatives are fused in alkali, the corresponding methyl compounds are produced by reduction of the chloromethyl groups.

Upon reduction by the usual vatting procedure, methyl derivatives are also produced. The dyeings developed therefrom are distinguished by their excellent fastness. In all cases, the color is shifted from the yellow of the starting material to a redder shade. For the purpose of making the leuco esters, the methyl reduction products of the new dyes are quite valuable. Pyranthrone, for example, gives a leuco ester too insoluble for commercial use. However, the introduction of one or two methyl groups into the pyranthrone nucleus gives an ester of very good solubility which prints on cotton in rich orange brown hues of excellent fastness properties.

The new chlormethyl polycyclic quinones of the pyranthrone, anthanthrone, and dibenzpyrenequinone series are produced by dissolving the pyranthrone, anthanthrone, or dibenzpyrenequinone compound in sulfuric acid of at least 95% strength and reacting with a chloralkylating agent such as dichlorodimethyl ether. The reaction mixture is heated to from 30° to 80° C. for several days. It is then cooled and poured into a large amount of ice and water. The precipitate is collected and washed with water until neutral. When it is desired to introduce more than two chloromethyl groups, the dichloro-dimethyl ether is reacted with the polycyclic quinone dye in pyridine in the presence of aluminum chloride as catalyst.

The reaction may be represented by the following equation:

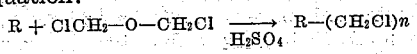

wherein R represents the pyranthrone, anthanthrone, or dibenzpyrenequinone radical and $n$ is an integer from 1 to 4.

The invention will be further described with respect to the following examples which are intended to be illustrative of the invention but not limitative of its scope. Unless otherwise stated, the parts are by weight.

EXAMPLE 1

Thirty-three g. of dibenzpyrenequinone were dissolved in 250 cc. of 96% sulfuric acid. To the solution was added dropwise 26.0 cc. of bischloromethyl ether. After heating at a temperature of 75° C. for four days, the reaction mixture was poured into ice and water, filtered and the filter cake washed neutral. Weight 37.1 g. chlorine calc. 9.25% chlorine found 7.32%. The bulk of the product corresponded to a monochloromethylated product which on vatting gave golden yellow dyeings of good fastness properties. The shade of the dyeings was somewhat redder than the starting material.

After vatting, the chloromethyl derivative was reduced to the monomethyl derivative and could be filtered off.

The chloromethyl product has the formula:

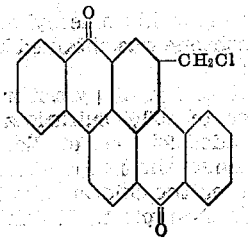

EXAMPLE 2

Dibenzpyrenequinone was dichloromethylated as follows:

To a solution of 33.0 g. of dibenzpyrenequinone in 200 g. of monohydrate was added 34.0 cc. of bischloromethyl ether. A temperature of 80° C. was maintained for 48 hours. By following the procedure of Example 1, a crude di(chloromethyl) dibenzpyrenequinone was obtained. Yield 38.0 g. Chlorine calculated 16.3% chlorine found 12.2%. The product has the formula:

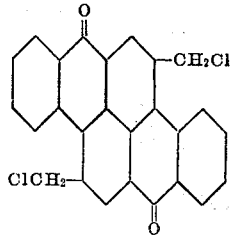

A dimethyl derivative was obtained on vatting which gave orange yellow dyeings of good fastness properties.

EXAMPLE 3

80.0 g. pyridine was added slowly to 320 g. of anhydrous aluminum chloride. The temperature was allowed to raise to 150° C. At 65–70° C., 52 g. of bischloromethyl ether was dropped in slowly. Then at 50–60° C. 33.2 g. of dibenzpyrenequinone was added over a period of one hour. The reaction was poured over 2000 g. of ice and 300 cc. of HCl. The yellow solid which was obtained was washed with dilute HCl and water. Weight, 41.0 g., chlorine calculated 16.3%, found 16.4%.

The analysis indicates that two chloromethyl groups have been introduced. Dyeings on cotton have good fastness properties and are somewhat redder than the dye of Example 2.

EXAMPLE 4

Eleven grams of anthanthrone were dissolved in 100 cc. of 100% sulfuric acid and 15.0 cc. of bischloromethyl ether. A temperature of 80° C. was held for 48 hours. The new dye was isolated as in Example 1. Weight, 13.0 g.; chlorine calculated 10.0%, found 7.35%.

On vatting, it was reduced to methyl anthanthrone and yielded dyeings of excellent fastness to light and to chlorine. The structure is believed to be the following for the chlormethyl derivative:

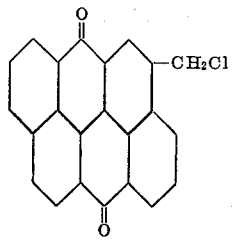

EXAMPLE 5

A mixture of monochloromethyl and di(chloromethyl)-pyranthrone was obtained by the following procedure:

A solution of 40.6 g. of pyranthrone was dissolved in 250 cc. of 100% sulfuric acid. To this solution was added 25.6 cc. of dichlorodimethyl ether. For 48 hours the temperature was held at 70–75° C. and then the chloromethylated dye was worked up as in Example 1. Weight 50.3 g. with chlorine content of 10.0%. The product has the formula:

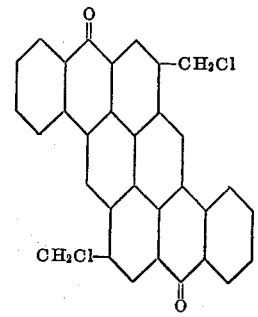

Upon vatting the compound was reduced to the corresponding methyl derivative which gave attractive yellow orange dyeings of excellent fastness properties. The leuco ester of this new dye was made in excellent yield and possessed good solubility unlike the parent dye.

EXAMPLE 6

*Chloromethylation of pyranthrone by the aluminum chloride method; preparation of dichloromethylpyranthrone*

One hundred sixty parts of pyridine are added slowly under mechanical stirring to 640 parts of anhydrous aluminum chloride, allowing the temperature to rise to 150–160° C. The almost complete solution was then allowed to cool to 65° C. with stirring and 104 parts of bischloromethyl ether are added fairly rapidly, maintaining the reaction temperature below 70° C. At 55–60° C., 81.2 parts of pyranthrone are added at such rate that the temperature is maintained at 55–60° C. The reaction mixture is heated at 60±2° C. for one hour and then the resulting dark viscous material is poured with hand stirring into a mixture of 2000 parts of ice-water and 600 parts of concentrated hydrochloric acid, chipped ice being added at intervals in such quantities that the temperature does not exceed 30° C. Then precipitated reddish-brown material is collected on a filter, washed well with water and once with ethanol. After drying at 60° C., 112.7 parts of product, which contains 14.8% of chlorine and consists chiefly of dichloromethyl pyranthrone, are obtained, having the same formula as in Example 5.

EXAMPLE 7

When Example 6 was repeated using one-half quantities and extending the reaction time to two hours, a mixture of equal molecular quantities of the dichloromethyl- and the trichloromethyl-pyranthrone is obtained (56.5 parts). This material contains 17.1% of chlorine. The formula for the trichloromethyl derivative of pyranthrone is:

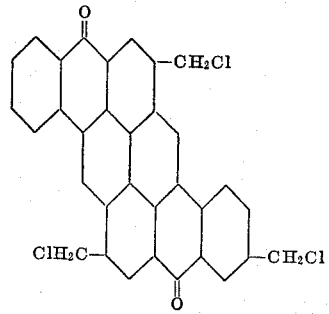

We claim:
1. Vat dyes and vat dye intermediates of the class consisting of chloromethyl derivatives of pyranthrone, anthanthrone, and dibenzpyrenequinone.

2. The vat dye intermediate mono(chloromethyl) dibenzpyrenequinone having the formula:

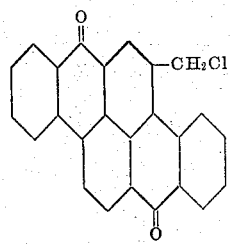

3. The vat dye intermediate di(chloromethyl) dibenzpyrenequinone having the formula:

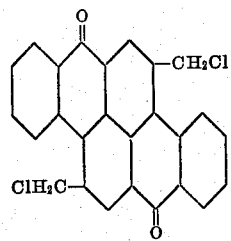

4. The vat dye intermediate mono(chloromethyl) anthanthrone having the formula:

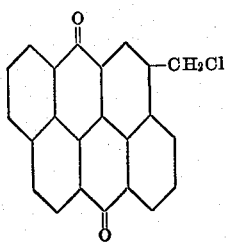

5. The vat dye intermediate di(chloromethyl) pyranthrone having the formula:

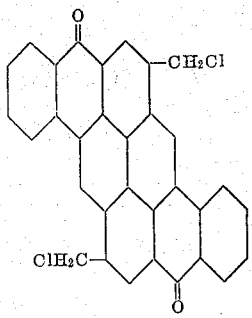

6. The vat dye intermediate tri(chloromethyl) pyranthrone having the formula:

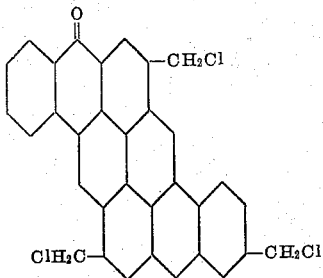

DAVID I. RANDALL.
TELLIS A. MARTIN.

References Cited in the file of this patent

UNITED STATES PATENTS

| Number | Name | Date |
|---|---|---|
| 1,924,443 | Kunz et al. | Aug. 29, 1933 |
| 1,926,155 | Kunz et al. | Sept. 12, 1933 |
| 2,123,245 | Koeberle et al. | July 12, 1938 |
| 2,238,940 | Linch et al. | Apr. 22, 1941 |

FOREIGN PATENTS

| Number | Country | Date |
|---|---|---|
| 613,983 | Great Britain | Dec. 7, 1948 |
| 623,998 | Great Britain | May 26, 1949 |